(12) United States Patent
Romero Esteban et al.

(10) Patent No.: US 11,787,101 B2
(45) Date of Patent: Oct. 17, 2023

(54) DEVICE AND METHOD FOR FORMING A COMPOSITE LAMINATE FOR OBTAINING A Z-SHAPED PROFILE

(71) Applicant: AIRBUS OPERATIONS S.L., Madrid (ES)

(72) Inventors: Salvador Romero Esteban, Madrid (ES); Augusto Perez-Pastor, Madrid (ES); Melania Sanchez Perez, Madrid (ES); Katia Fernandez Horcajo, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 173 days.

(21) Appl. No.: 17/097,667

(22) Filed: Nov. 13, 2020

(65) Prior Publication Data

US 2021/0138713 A1 May 13, 2021

(30) Foreign Application Priority Data

Nov. 13, 2019 (EP) ..................................... 19382995

(51) Int. Cl.
*B29C 53/04* (2006.01)
*B29C 53/84* (2006.01)
(Continued)

(52) U.S. Cl.
CPC ............. *B29C 53/04* (2013.01); *B29C 53/84* (2013.01); *B29K 2101/12* (2013.01); *B29L 2031/001* (2013.01)

(58) Field of Classification Search
CPC .......... B29C 53/04; B29C 70/00; B29C 70/46
See application file for complete search history.

(56) References Cited

U.S. PATENT DOCUMENTS 4,443,398 A * 4/1984 Martinelli .......... G11B 23/0332
156/227
4,512,837 A * 4/1985 Sarh .................... B29C 63/0034
156/194
(Continued)

FOREIGN PATENT DOCUMENTS

| EP | 1 481 790 | 12/2004 |
| EP | 2 868 465 | 5/2015 |
| WO | 2016/174400 | 11/2016 |

OTHER PUBLICATIONS

Search Report for EP19382995, dated Apr. 29, 2020, 2 pages.

*Primary Examiner* — Andrew D Graham
(74) *Attorney, Agent, or Firm* — Nixon & Vanderhye P.C.

(57) ABSTRACT

A device for forming a composite laminate (10) for obtaining a Z-shaped profile (1) including: a grip module (5) comprising two plates (6) configured to enclose and grip between the two plates (6) a first portion of the composite laminate (10) that will form a first flange (3), and a feed module (7) comprising two plates (8) configured to enclose between the two plates (8) a second portion of the composite laminate (10), wherein the feed module (7) is configured to heat the portion of the composite laminate (10) located between its two plates (8) and to be movable with respect to the grip module (5) parallel to the plane of the web (2) of the composite profile (1) once formed to a second position in which the two plates (8) enclose the portion of the composite laminate (10) that will form a second flange (4).

9 Claims, 3 Drawing Sheets

(51) Int. Cl.
*B29K 101/12* (2006.01)
*B29L 31/00* (2006.01)

(56) References Cited

U.S. PATENT DOCUMENTS

| | | | | |
|---|---|---|---|---|
| 4,649,008 A * | 3/1987 | Johnstone | B29C 48/905 | 428/101 |
| 4,980,013 A * | 12/1990 | Lowery | B29C 70/345 | 425/398 |
| 5,026,447 A * | 6/1991 | O'Connor | B29D 99/0007 | 264/296 |
| 5,026,514 A * | 6/1991 | Hauwiller | B29D 99/0003 | 264/258 |
| 5,192,383 A * | 3/1993 | Cavin | B29C 70/527 | 156/289 |
| 5,681,513 A * | 10/1997 | Farley | B29C 70/525 | 264/102 |
| 5,716,487 A * | 2/1998 | Sumerak | B29C 70/525 | 156/359 |
| 6,299,964 B1 * | 10/2001 | Riddle | B29C 43/12 | 425/468 |
| 7,670,525 B2 * | 3/2010 | Weidmann | B29C 70/32 | 264/247 |
| 10,232,532 B1 * | 3/2019 | Prebil | B29C 66/721 | |
| 11,014,314 B2 * | 5/2021 | Anderson | B29C 70/541 | |
| 2004/0265536 A1 * | 12/2004 | Sana | B29C 70/46 | 428/119 |
| 2005/0029707 A1 * | 2/2005 | Kasai | B29D 99/0003 | 264/258 |
| 2005/0186081 A1 * | 8/2005 | Mohamed | D03D 15/267 | 416/226 |
| 2006/0011289 A1 * | 1/2006 | Suriano | B29C 70/345 | 156/245 |
| 2006/0216480 A1 * | 9/2006 | Weidmann | B29C 70/32 | 156/221 |
| 2006/0249868 A1 * | 11/2006 | Brown | B29C 70/382 | 156/196 |
| 2007/0161483 A1 * | 7/2007 | Raf | B29C 70/345 | 493/296 |
| 2007/0175575 A1 * | 8/2007 | Rubin | B29C 65/02 | 156/196 |
| 2009/0026315 A1 * | 1/2009 | Edelmann | B29C 70/48 | 244/119 |
| 2009/0065977 A1 * | 3/2009 | Suzuki | B29C 53/04 | 425/383 |
| 2010/0102482 A1 * | 4/2010 | Jones | B29C 43/58 | 264/320 |
| 2010/0136293 A1 * | 6/2010 | Kubryk | B29C 70/342 | 156/196 |
| 2010/0148005 A1 * | 6/2010 | Weidmann | B29C 70/541 | 428/113 |
| 2010/0225016 A1 * | 9/2010 | Prebil | B29C 33/306 | 425/195 |
| 2012/0006475 A1 * | 1/2012 | Colombo | B29C 70/388 | 156/243 |
| 2012/0076973 A1 * | 3/2012 | Guzman | B29C 70/207 | 156/499 |
| 2014/0190625 A1 * | 7/2014 | Buttrick | B29C 70/541 | 156/196 |
| 2015/0041048 A1 * | 2/2015 | Anderson | B29C 70/38 | 156/196 |
| 2015/0174831 A1 * | 6/2015 | M Guez Charines | B32B 38/0012 | 156/196 |

* cited by examiner

DEVICE AND METHOD FOR FORMING A COMPOSITE LAMINATE FOR OBTAINING A Z-SHAPED PROFILE

RELATED APPLICATION

This application claims priority to European Patent Application 19382995-9, filed Nov. 13, 2019, the entirety of which is incorporated by reference.

TECHNICAL FIELD

The invention relates to a device and a method for forming a composite laminate, for instance, a continuous fiber reinforced stratified thermoplastic composite laminate, in order to obtain a profile having a straight or curved Z cross-section.

BACKGROUND

It is known to manufacture profiles from stratified thermoplastic composite materials which may incorporate one or several folds such that a Z-shaped profile is formed. Examples of these profiles are frames or stringers used in aircraft structures. The common manufacturing process for said profiles is by stamping processes or, alternatively, by continuous processes as pultrusion/extrusion.

These processes have some drawbacks when the curvature of the profiles is high. For example, known forming processes introduce wrinkles, particularly in curved Z-shaped structures, because a compression stress is applied to the different layers of the stratified laminate due to the direction of the folding when making the flanges of the profile. For instance, in stamping processes, wrinkles appear due to the excess of material between the initial flat laminated and the final three dimensions shape of the profile.

Previously mentioned continuous processes are normally performed for nearly straight profiles but not for kinked profiles.

Therefore, no mature manufacturing processes are developed to cover complex profiles, as frames or stringers, especially in rear and nose fuselages having a radius of curvature smaller than 1 meter (m).

SUMMARY

The invention may be embodied as a device for forming a composite laminate for obtaining a Z-shaped profile. Specifically, the Z-shaped profile has three different areas, a web and two flanges a first and a second flange located at both ends of the web. Flanges can be flat or curved with respect to the longitudinal axis of the profile. Additionally, flanges may be parallel between them and may have different angles with respect to the web, being 90° the most common angle.

The invention may be embodied to include a grip module comprising two plates. The grip module is configured to enclose and grip between the two plates, e.g., holding firmly, a first portion of the composite laminate to be formed. This first portion corresponds to the area of the laminate that will form the first flange after being formed, and a feed module comprising two plates. The feed module is configured to enclose between the two plates a second portion of the composite laminate that is different from the first portion located in the grip module.

The feed module is configured to heat the portion of the composite laminate located between its two plates such that it reaches the corresponding melting point. The feed module is also configured to be movable with respect to the grip module in a direction parallel to the plane of the web of the composite profile (1) once it is formed.

The movement is performed between the following two positions: a first position in which the two plates enclose the portion of the composite laminate corresponding to the area of the composite laminate that will form the web and the second flange, and a second position in which the two plates enclose the portion of the composite laminate corresponding to the area of the composite laminate that will form the second flange.

During the movement between the first and second positions, the portion of the composite laminate corresponding to the web slides out of the two plates of the feed module due to the relative movement between the grip module (5) and the feed module.

The forming device is thus divided into two different modules, the grip module and the feed module. The feed module encloses the larger laminate area at the beginning of the process and also feeds the web formation.

The plates of each module are holding the laminate, gripping the laminate in the grip module and allowing a sliding movement of the laminate in the feeding module.

The feed module moves parallel to the plane of the web while forming the profile. Therefore, the forming process is thus performed always in a direction that avoids excess of material. Moreover, the laminate is subjected to tensile stress induced by the movement of the feed module with respect to the grip module, thus producing the final shape and a fully consolidated component and avoiding wrinkle formation.

According to the above, for instance for a Z-shaped profile having flanges forming 90° with the web, the feed module, with the laminate in the interior, move parallel to the web plane, i.e. in a plane perpendicular to the plane of the flange. Thus, the movement turns the laminate direction in the web area and produces the flange bending radius.

As previously stated, this relative displacement, at low speed in to allow the sliding between the fibers, avoids the formation of wrinkles.

The area of the laminate intended to be in the web of the profile is placed between the plates of the feed module. The plates of the feed module should not securely clamp the laminate because the laminate is allowed to slide between the plates as the feed module moves with respect to the grip module. As the feed and grip modules move further apart, the laminate slides between the plates of the feed module and pulls partially out from the feed module. The plates of the grip module clamp the first flange of the module such that the laminate does not move with respect to the plates of the grip module during the movement of the feed module with respect to the grip module.

The feed and grip modules perform an effective process in which a thermoplastic composite laminate is formed while avoiding wrinkles in the resulting Z-shaped profile. The grip and feed modules may be used to form laminates having straight and curved Z-shaped profiles.

This feed and grip modules may be used to form Z-shaped profiles of laminates made of invention also applies to different carbon fiber reinforced thermoplastic composite laminates, the one composed of unidirectional fiber plies and the one composed of fabric fiber plies.

In addition, the feed and grip modules may be used for different types of laminates, such as "only welded" laminates in which the plies of the laminate are joined together with only small welded areas and "pre-consolidated" laminates in which the laminate has undergone a consolidation process to obtain a rigid body laminate.

The feed and/or grip modules may heat the laminate by transmitting heat to the laminate before and during the relative movement of the modules. The laminate may be heated to or near a melt temperature for the laminate. The heated laminate becomes pliable and thus more susceptible in order the laminate can reach the melting state to be formed. The laminate is heated by conduction from the plates of the feed and/or grip modules to the laminate griped between the plates. The plates may be heated.

The invention may be embodied as a method for forming a composite laminate for obtaining a Z-shaped profile. The method comprises the following steps: (i) providing a grip module comprising two plates, (ii) providing a feed module comprising two plates, (iii) enclosing a first portion of the laminate between the two plates of the grip module in the area of the laminate that will form the first flange, (iv) enclosing a second portion of the laminate different than the first portion located in the grip module between the two plates of the feed module, (v) heating the portion of the laminate located in the feed module, and (vi) moving the feed module with respect to the grip module in a direction parallel to the direction that the web plane of the profile will have once formed between: a first position in which the two plates enclose the laminate in the area of the composite laminate that will form the web and the second flange, and a second position in which the two plates enclose the area of the composite laminate corresponding to the second flange, such that during the movement between the first and second positions, the area of the composite laminate forming the web slides out of the two plates of the feed module due to the relative movement between the grip module and the feed module.

SUMMARY OF FIGURES

To complete the description and in order to provide for a better understanding of the invention, a set of drawings is provided. Said drawings form an integral part of the description and illustrate embodiments of the invention. The drawings comprise the following figures.

DETAILED DESCRIPTION

Figure 1:
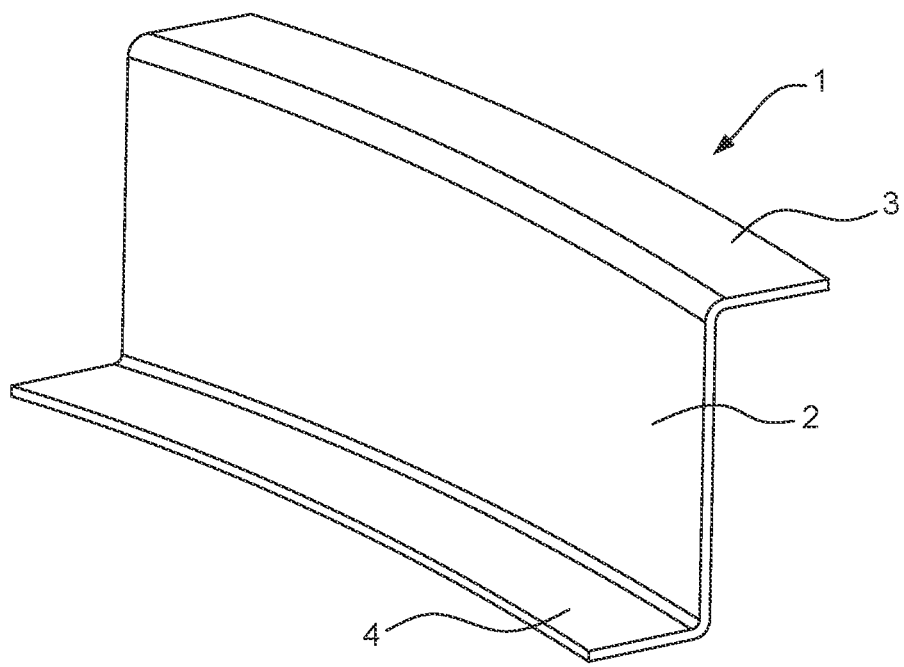
FIG. 1 shows a schematic perspective view of a curved Z-shaped profile.

FIG. 1 shows an embodiment of a Z-shaped profile (1) formed by a composite stratified laminate with a flat central surface or web (2) and two flanges (3, 4) forming 90° with the web (2) in a cross-section. The profile (1) is a curved profile (1), e.g., in its longitudinal direction it describes a curve. The feed and grip modules may be used to form a composite laminate beam which is straight longitudinally and having Z-shaped profile in cross section. Similarly, the feed and grip modules may form a composite laminate beam have a curvature in a longitudinal direction and a curved Z-shaped profile in cross section.

The composite laminate has in its Z-shaped cross section two corners each with a corresponding radii that are formed during movement between the feed and grip modules.

Figure 2:
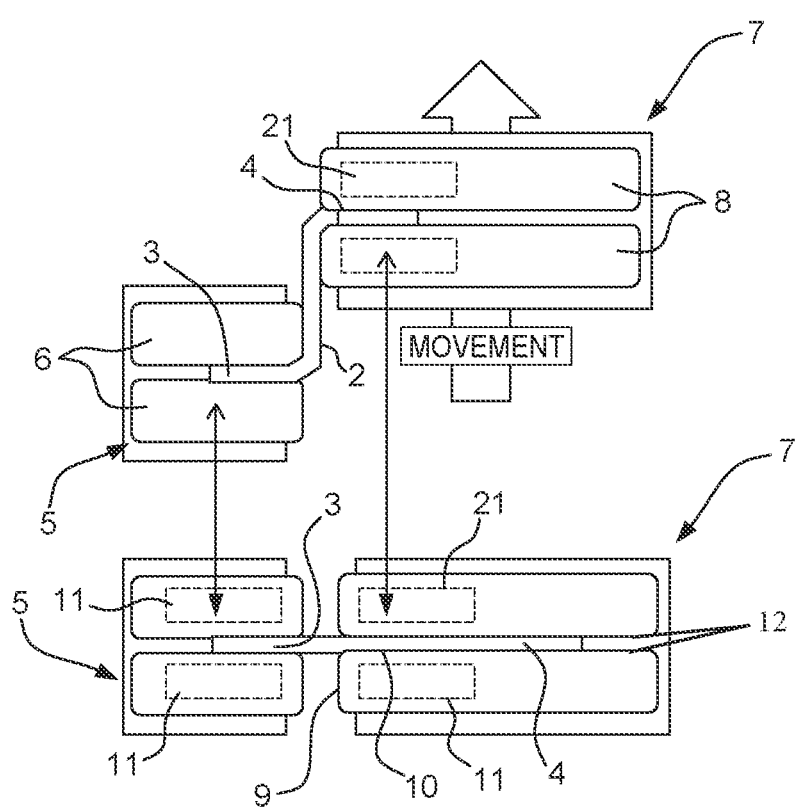
FIG. 2 shows a schematic cross section of an embodiment of the invention in a first and a second position and the movement that the feed module performs to reach the second position.
Figure 3:
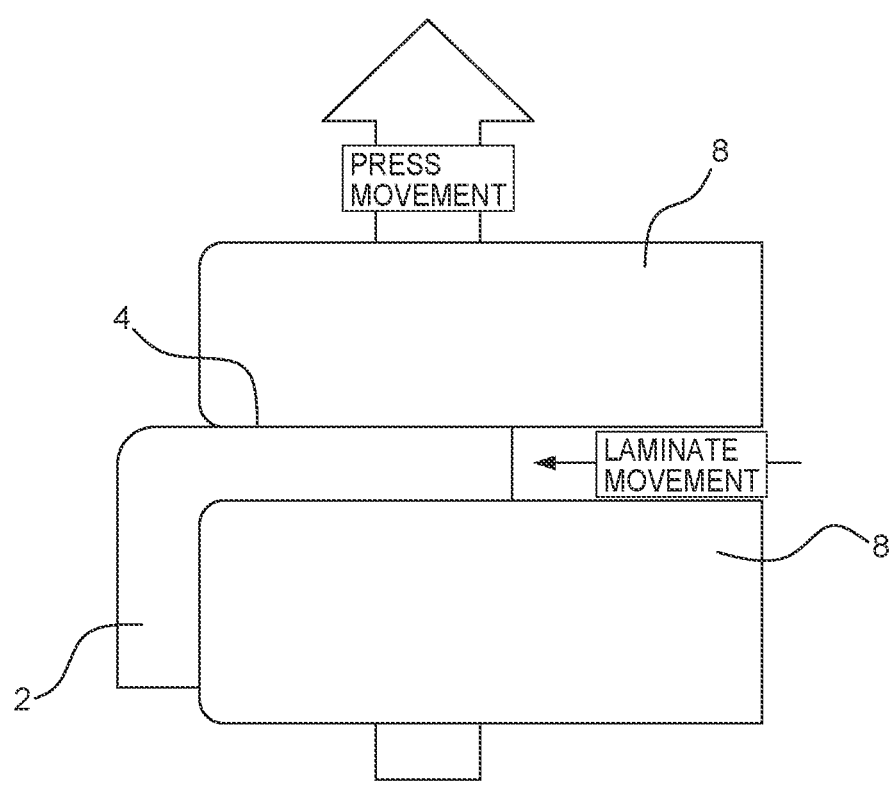
FIG. 3 shows an enlarged view of the schematic cross section of the embodiment of FIG. 2 showing the feed module into the second position.

As shown in FIG. 2, the grip module (5) comprises two grip plates (6). The grip plates have opposing surfaces separated by a gap configured to receive a first portion of the composite laminate (10). The gap may be adjustable to allow gap to be increased to allow the composite laminate to be inserted between the grip plates (6) and to allow the gap to be reduced to clamp the grip plates onto the composite laminate (10). When clamped, the composite laminate (10) is securely held between the grip plates (6).

The grip module (5) encloses and grips the first portion of the composite laminate (10). The first portion becomes the first flange (3) of the Z-shaped cross sectional profile. The feed module (7) includes two plates (8), and a portion of the composite laminate is between these two plates. The portion between the plates of the feed module become a second flange (4) of the Z-shaped cross-sectional profile. Before the relative movement of the feed and grip modules, the composite laminate may be flat, e.g., planar, when between the plates of the two modules.

The feed module (7) comprises two feed plates (8). The feed plates have opposing surfaces separated by a gap configured to receive a second portion of the composite laminate (10). The gap need not be adjustable as the composite laminate is not griped between the feed plates (8) and is allowed to slide between these plates. However, having an adjustment to the gap between the feed plates would allow the gap to be increased while the composite laminate is inserted between the feed plates and to allow the gap to be reduced until the composite laminate (10) is snug, but not clamped to prevent sliding, between. the feed plates. The composite material (10) is held between the feed plates to ensure that the composite material is formed into a Z-shape profile as the feed and grip modules move relative to each other, and to prevent warping or wrinkling of the composite material in directions parallel to the direction of relative movement between the feed and grip modules.

The feed module moves with respect to the grip module (5) in the direction parallel to the plane of the web (2) to be formed in the composite profile (1). The feed model may be propelled along a track or by a crane or other movement device.

In the first position, the two plates (8) of the feed module (7) enclose the portion of the composite laminate (10) corresponding to the area of the composite laminate (10) that will form the web (2) and the second flange (4).

In the second position in which the two plates (8) enclose the portion of the composite laminate (10) corresponding to the area of the composite laminate (10) that will form the second flange (4).

During the movement between the first and second positions, the portion of the composite laminate (10) corresponding to the web (2) slides out of the two plates (8) of the feed module (7) due to the relative movement between the grip module (5) and the feed module (7).

Specifically, in the first position, the grip module (5) and the feed module (7) are located facing and aligned with each other such that the composite laminate (10) depicts a flat plane.

The inner surfaces of the plates (6) of the grip module (5) may apply a uniform load to the composite laminate (10). These surfaces may also be treated to increase the grip effect.

The device may include a gap (9) between the grip module (5) and the feed module (7) in the direction perpendicular to the plane of the plates (6, 8). The gap (9) is configured to have a width dimension equal to or substantially, i.e., within 10%, greater than the thickness of the laminate (10).

The feed module (7) may be heated due to contact between the feed module and a heat source, such as heated plate; due to the feed module being within a heated environment such as an oven, or by heated internal plates (11) within each of the plates of the feed module.

For curves flanges (3, 4), the grip and feed modules (5, 7) comprise one of the planes of their plates (6, 8) in contact with the composite laminate (10) of each module (5, 7) being a concave plate and the other plate being a convex plate to perform said curved flanges (3, 4).

For instance, the grip module (5) may comprise a concave principal lower plate (6) where the corresponding portion of composite laminate (10) is placed and a convex cover or upper plate (6) to hold down this portion of the composite laminate (10). The feeding module (7) comprising a convex principal upper plate (8) and a concave cover or upper plate (8) to enclose its corresponding portion of laminate (10). This arrangement of concave and convex plates (6) in the grip module (5) and concave and convex plates (8) in the feeding module can be used to produce a composite material beam having a Z-shape profile in cross section, wherein the beam curves about an axis perpendicular to a plane of the web (2) and the curved flanges (3, 4) are curved about the axis.

To reduce friction coefficient between the composite laminate (10) and the plates (6, 8), a high temperature resistance release film (12) can be located over the surfaces of the plates (8) configured to be in contact with the composite laminate (10) to reduce the friction coefficient between the plates (8) and the composite laminate (10). The release film shall be located mainly within the feeding area of the feed module. An example of a release film may be a polyimide film.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method to form a composite laminate to have a Z-shaped profile in cross section, wherein the Z-shaped profile includes a web, a first flange joined to the web along first longitudinal edge of the web, and a second flange joined to the web along a second longitudinal edge of the web, the method comprising:
   positioning a first portion of a composite laminate between grip plates of a grip module, wherein the first portion is to be formed into the first flange,
   positioning a second portion of the composite laminate between feed plates of a feed module, wherein the second portion is spaced from the first portion;
   heating the second portion of the composite laminate while the second portion is between the feed plates;
   moving at least one of the feed module and the grip module in a direction parallel to a plane in which the web will be formed, wherein the movement is between a first position to a second position, wherein while in the first position the composite laminate extends along a straight line extending between the grip plates and between the feed plates; and
   after the moving to the second position, removing the composite laminate from the feed plates and the grip plates, wherein the removed composite laminate has the Z-shaped profile in cross section including the first flange, the web and the second flange;
   wherein at the first position, the second portion of the composite laminate includes a first area to be formed into the web and a second area to be formed into the second flange,
   wherein during the movement, the first area of the second portion of the composite laminate slides from between feed plates and moves into a gap between the feed module and the grip module,
   wherein after the movement to the second position, the removal step includes removing the second area of the second portion of the composite laminate remains the between feed plates, and
   wherein due to the movement between the first and second positions, the composite laminate is formed into the Z-shaped profile in cross section.

2. The method of claim 1, further comprising clamping the grip plates onto the first portion of the composite laminate.

3. The method of claim 1, wherein in the first position, the grip module and the feed module face each other and the composite laminate is aligned with a plane perpendicular to a movement direction between the feed and grip modules.

4. The method according to claim 1, wherein the gap between the grip module and the feed module is equal to or no more than ten percent greater than a thickness of the composite laminate.

5. The method according to claim 1, wherein the heating of the second portion of the composite laminate includes heating the feed plates.

6. The method according to claim 1, wherein:
   the feed plates include a first feed plate which is concave along a longitudinal direction of the feed module and a second feed plate which is convex along the longitudinal direction of the feed module, and
   the grip plates include a first grip plate which is concave along a longitudinal direction of the grip module and a second grip plate which is convex along the longitudinal direction of the grip module.

7. The method according to claim 1, further comprising positioning a temperature resistant release film on a surface of each of the feed plates before the step of positioning a second portion of the composite laminate between the feed plates, wherein the temperature resistance film is in contact with the composite laminate.

8. The method according to claim 1, wherein each of the feed plates has a contact surface and the method further comprises applying a temperature resistance film to each of the contact surfaces of the feed plates before the step of positioning a second portion of the composite laminate between the feed plates,
   wherein the temperature resistance film contacts the composite laminate, and each contact surface is covered with a temperature resistant release film such that the temperature resistant release film is sandwiched between a respective one of the feed plates and the composite laminate to reduce friction between the feed plate and the composite laminate.

9. The method according to claim 8, wherein during the step of moving at least one of the feed module and the grip module, the first portion of the composite laminate remains between the grip plates and does not substantially move relative to the grip plates.

* * * * *